United States Patent [19]
Schulz et al.

[11] Patent Number: 5,940,951
[45] Date of Patent: Aug. 24, 1999

[54] PROCESS FOR THE MANUFACTURE OF CLADDED METAL PIPES

[75] Inventors: Wolfgang Schulz, Krefeld; Josef Worringer, Kempen, both of Germany; Donald Osborn, East Amherst, N.Y.

[73] Assignee: International Extruded Products, LLC, Buffalo, N.Y.

[21] Appl. No.: 08/852,639

[22] Filed: May 7, 1997

[30] Foreign Application Priority Data

Oct. 30, 1996 [DE] Germany .............. 196 44 999

[51] Int. Cl.⁶ .............. B23P 17/00; B21D 39/00
[52] U.S. Cl. .............. 29/421.1; 29/523; 228/131; 228/136; 228/265
[58] Field of Search .............. 29/421.1, 523; 138/140; 228/128, 131, 136, 265

[56] References Cited

U.S. PATENT DOCUMENTS

| | | | |
|---|---|---|---|
| 4,359,811 | 11/1982 | Monroe | 29/523 |
| 4,744,504 | 5/1988 | Turner | 228/127 |

FOREIGN PATENT DOCUMENTS

| | | |
|---|---|---|
| 0 636 446 A2 | 2/1995 | European Pat. Off. . |
| 44 06 188 C1 | 3/1995 | Germany . |
| 57-85683 | 5/1982 | Japan .............. 228/136 |
| 58-159989 | 9/1983 | Japan . |

Primary Examiner—P. W. Echos
Attorney, Agent, or Firm—Proskauer Rose LLP

[57] ABSTRACT

A process for the manufacture of cladded metal pipes facilitates joining of a tube blank and a coaxially disposed pipe section received therein, for subsequent extrusion of a resultant tube blank-pipe combination to form an internally-clad pipe of desired dimension. The pipe section, which is inserted into the tube blank, is expanded radially by internally directed pressure, while force is axially applied to maintain the expansion of the pipe section following removal of the applied internal pressure and axial force. A mechanically joined tube blank-pipe combination thus formed is extruded to form a finished pipe of desired profile in which a diffusion bond is present between material layers comprising the internally-clad pipe corresponding to the pipe section and the tube blank.

12 Claims, 2 Drawing Sheets

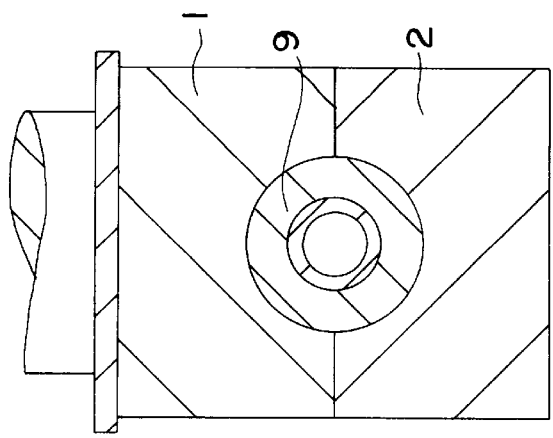
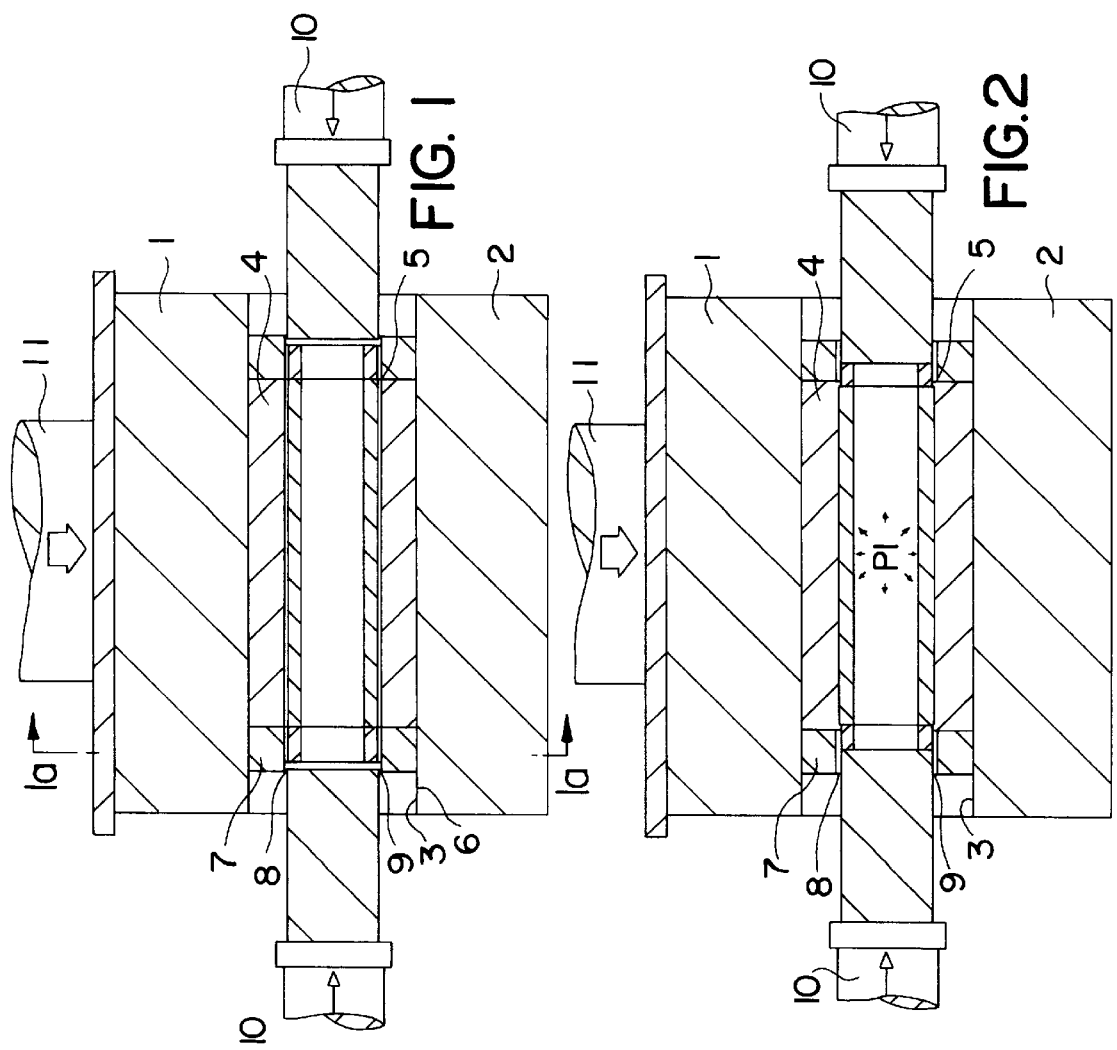

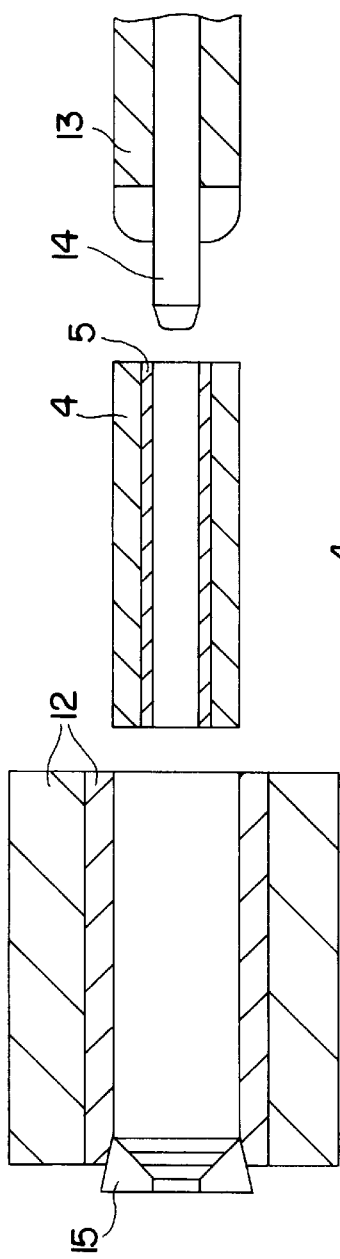
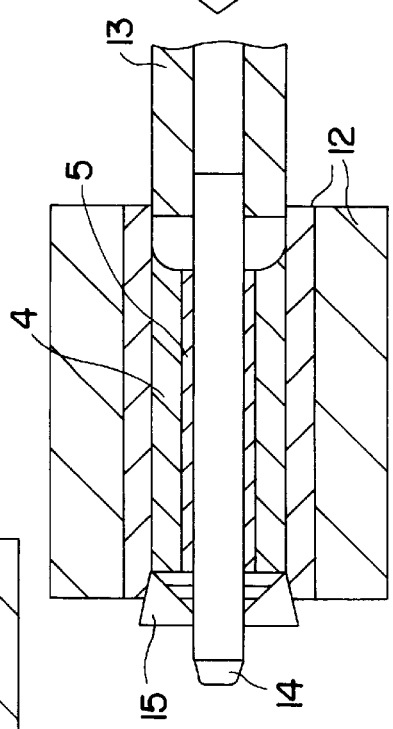
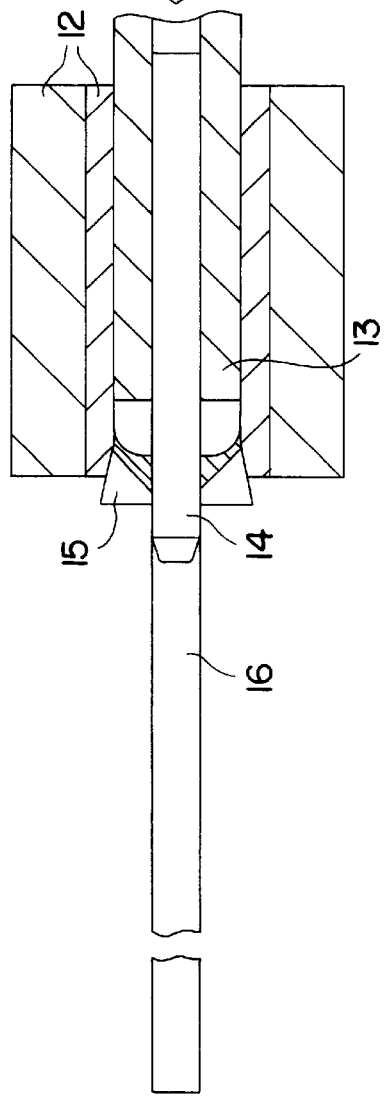

PROCESS FOR THE MANUFACTURE OF CLADDED METAL PIPES

BACKGROUND OF THE INVENTION

The invention relates to a process for the manufacture of clad metal pipes, and, in particular, internally-clad metal pipes. Several manufacturing processes are known for the manufacture of clad metal pipes:

1. Roll-welding

Roll-clad metal plates are bent to form a pipe which is longitudinally welded.

2. Centrifugal casting

A molten metal is cast into a metal pipe which is mounted on bearings in such a way as to be rotatable about its axis. The molten metal is distributed evenly along the length and across the internal circumference of the metal pipe during its rotation.

3. Internal-pressure plating

An internal thin-walled pipe, which forms the internal cladding, is inserted accurately to fit into a metal pipe, and pressed onto the inner circumferential surface of the outer pipe by the creation of an internal pressure, German patent 4,406,188.

4. Extrusion

A metallic inner pipe which forms the later cladding is pushed into a metal pipe, an alloy with a low melting-point is plated onto the inner circumferential surface of the outer pipe, to act as a bonding agent. The intermediate space between both pipes is then evacuated, the combination is heated to approximately 1100° C., whereby the bonding metal alloy melts and diffuses between the two pipes and the pipe combination is then hot-extruded, U.S. Pat. No. 4,744,504.

In the awareness that all the foregoing processes are very elaborate, inasmuch as, in each case, a large number of manufacturing stages must be accomplished, which renders the final product expensive, and therefore less competitive in comparison with solid monowall pipes made of expensive corrosion-resistant materials, the object of the present invention is based on simplifying the manufacturing process for making clad pipes in order for the final product to be offered at a more attractive price and more competitively than pipes made of solid expensive corrosion-resistant material. The aim is in each case the manufacture of clad pipes, and of internally-clad pipes in particular, made of metals or metal alloys. The cladding, being applied on the side facing towards the product being conveyed in the pipe, is of material, and of corrosion-resistant material in particular, such as corrosion-resistant stainless steel or nickel-base alloy. On the reverse side, the actual carrying pipe is intended to be made of lesser value material, such as carbon or low alloy steel, or similar material.

In principal, it is of course also possible for the cladding to be formed from two or more layers, although as a rule the cladding will be a single layer. It is indeed also possible to conceive of instances in which a pipe could be made of lower-value material with both sides, i.e. external and internal, clad with expensive materials. The focus of attention, however, is on applications in which the internal circumferential surface of the conveying pipe is clad with a more expensive material. The invention is therefore described hereinafter on the basis of this last mentioned application, without the process represented herein being restricted to such single-layer internally-clad pipes.

SUMMARY OF THE INVENTION

To resolve the task as indicated above, a process is proposed according to the invention for the manufacture of clad metal pipes, which is characterised by the combination of the following measures:

(a) A pipe section, with a greater wall thickness and shorter length in relation to the final product, which forms the later clad coating, is inserted into a tube blank; the said pipe section has the same length as the tube blank and an external diameter which corresponds to the internal diameter of the tube blank, which as well is of greater wall thickness in relation to the wall thickness in the final product. The pipe section fits accurately after the opposite circumferential surfaces of the tube blank and the pipe section have been machined to be metallically bright;

(b) The pipe section is placed under internal pressure in such a way that it fits flush on the inner circumferential surface of the tube blank, expelling the air present between it and the tube blank, in which situation the pipe section is simultaneously upset in the axial direction;

(c) The pipe combination formed from the tube blank with the expanded and upset pipe section is heated to shaping temperature, and then extruded in one movement to final dimension.

The process according to the invention solves the set object. For the preparation of the pipe combination for the production of the internally-clad pipe by the inherently-known extrusion process, surprisingly, one single operational stage is sufficient, namely the subjecting to internal pressure and simultaneous upsetting of the pipe section which forms the later internal plating. Without any further means, such as the application of a bonding material or the evacuation of the intermediate space, as was considered necessary according to U.S. Pat. No. 4,744,504, an excellent form of bonding between both pipes is sufficient, which with subsequent extrusion leads to a well-defined diffusion bond between both materials. The bonding between the internal cladding pipe and the tube blank, which takes place on a hydraulic press, is also considerably simpler and more economical to carry out than all the known processes referred to in the preamble.

According to the process according to the invention, a clad pipe can be processed with a seamless pipe section and a seamless tube blank. The use of a welded tube blank and a welded pipe section is, however, also possible. In the final analysis, the use of seamless tube blank with a welded pipe section or a welded tube blank with a seamless pipe section is also conceivable.

The use of a tube blank made of carbon or low alloy steel with a pipe section made of corrosion-resistant stainless steel or nickel base alloy is preferred. The conveying pipe can, however, also be made of any other metallic material, and the pipe section of another high-quality metal or metal alloy.

The pipe section is, for preference, pressed into the tube blank under pressures of up to 35,000 bar by hydraulic means, while simultaneously upsetting in the axial direction. The values of the pressures to be applied in each case for the expansion, and the value of the forces for the upsetting of the pipe section, depend on the geometrical circumstances, and in particular on the diameter and wall thickness, as well as on the material strength.

According to a preferred embodiment of the process according to the invention, the pipe combination formed from the tube blank with the expanded and upset pipe section is extruded after heating to a temperature in the range from 1000 to 1280° C., to a multiple of its length.

DESCRIPTION OF THE DRAWINGS

The process according to the invention is described in greater detail on the basis of the drawings. These show:

FIG. 1 the longitudinal section through a hydraulic press in the position prior to the imposition of the expansion pressure, and the cross-section along the line A-B in figure section 1a;

FIG. 2 the longitudinal section of the hydraulic press in operation;

FIG. 3 the longitudinal section of the extrusion die, the pipe combination formed from the tube blank and the pipe section, as preliminary material for the subsequent extrusion, and the extrusion press punch prior to the initiation of the extrusion process;

FIG. 4 the longitudinal section of the extrusion press immediately before the start of the extrusion process;

FIG. 5 the extrusion press device at the end of the extrusion process.

DETAILED DESCRIPTION OF THE DRAWINGS

The hydraulic press in accordance with FIG. 1 consists of the upper section of the die 1 and the lower section of the die 2, with the cylindrical mounting 3 configured for an accurate receptional fit therein of the pipe combination formed from the tube blank 4 and the pipe section 5. The upper punch 11 holds the upper section of the die 1 and the lower section of the die 2 closed. The gap 6 between the tube blank 4 and the pipe section 5 is, for the sake of clarity, shown somewhat exaggeratedly wide. In principle, the pipe section 5 is located accurately to fit in the tube blank 4. The sealing rings 7,8, are placed against the ends of the pipe combination 4,5. Between the sealing rings 7,8 axial apertures 9 are formed for the evacuation of air from the annular space 6.

To initiate the expansion process, the pressure punches 10 are applied from both sides, as shown in FIG. 2. Hydraulic fluid is then introduced into the pipe section 5 through bore holes in one or both pressure punches 10, and an internal excess pressure P1 is created therein. This internal excess pressure has the effect of causing a uniform radial expansion of the pipe section 5, and causes the said pipe section to come in contact with the internal circumferential surface of the tube blank 4. In this situation, the air located in the gap 6 is expelled through the axial apertures 9. At the same time as the creation of the internal excess pressure, the pipe section 5 is upset from its ends, by means of the pressure function 10, in order to support the radial expansion process and maintain the pipe section 5 in its expanded state. In this way, a compressed combination is achieved between the tube blank 4 and the pipe section 5 even after the release of the expanding and upsetting pressures.

EXAMPLE

A pipe section made of the corrosion-resistant stainless steel AISI 316L is pushed into a tube blank made of a carbon steel (St52), of 1700 mm length and 560 mm external diameter and 93 mm wall thickness. The said pipe section having the same length and an external diameter which corresponds to the internal diameter of the tube blank, and an internal diameter of 336 mm, inserted so as to be accurately fit. The external circumferential surface of the pipe section 5 and the internal circumferential surface of the tube blank 4 are machined with the removal of material, e.g. by turning or grinding, in order to remove scale and to render the surfaces metallically bright for the improvement of the diffusion bonding. The mechanical bond is established under hydraulic pressure of 8,000 bar. The hydraulic fluid used during the pressing process has a compressibility at 1,000 bar of approx. 5% and at 10,000 bar approx 20%. For the upsetting process applied simultaneously with the expansion, a horizontal force is applied in the axial direction of the pipe section, the said axial effect causing a state of tension in the pipe section wall which is above the elasticity limit of the pipe section material, thus maintaining its expanded state.

The tube blank-pipe combination 4,5 prepared in this way is conveyed in accordance with FIGS. 3 and 4 into an extrusion device 12. The extrusion punch 13 contains a mandrel 14, which, in combination with the extrusion press die orifice 15, limits the cross-section of the extruded pipe profile 16. The extruded pipe profile has, for example, an external diameter of 355 mm, while the external pipe is reduced to a wall thickness of 12.7 mm and the inner pipe to a wall thickness of 3 mm, by the extrusion process. The pipe has achieved a length of 15.6 m corresponding approximately to nine times the initial length of the pipe combination.

After the manufacture of the mechanical bond between the tube blank and the pipe section, the pipe combination is heated to the extrusion temperature of approx 1,180° C. The heated pipe combination is then brought into the extrusion press 12, and extruded in one movement.

The method of heating may be with a radiant type furnace, with an induction coil or a combination of the two methods.

We claim:

1. A process for the manufacture of clad metal pipes, comprising the steps of:

providing a pipe section and a tube blank, said pipe section having an outer diameter permitting reception thereof within said tube blank;

introducing said pipe section into said tube blank;

exposing said pipe section to an internal pressure an amount sufficient to expand said pipe section outwardly to an expanded state in which an external circumferential surface of said pipe section is brought into mechanically joined contact with an inner circumferential surface of the tube blank;

applying an axially directed force on said pipe section while said step of exposing is being carried out in an amount at least sufficient to result in a plastic deformation of said pipe section when enlarged to said expanded state by said internal pressure whereby said expanded state is maintained following a subsequent removal of said internal pressure and said axially directed force, and thereby resulting in formation of a mechanically bonded pipe combination;

heating said pipe combination to a shaping temperature; and extruding said pipe combination to a final dimension.

2. A process according to claim 1, further comprising:
externally supporting said tube blank against expansion during said steps of exposing and applying.

3. A process according to claim 1, further comprising:
venting, from an end of said tube blank, any trapped air present between said tube blank and said pipe section received therein expelled from therebetween when said pipe section is enlarged to said expanded state during said step of exposing.

4. A process according to claim 1, wherein said pipe section and said tube blank are correspondingly configured to permit an accurate receptional fit of said pipe section in said tube blank prior to said step of exposing.

5. A process according to claim 1, wherein circumferential surfaces of said pipe section and said tube blank opposed to one another when said pipe section is introduced into said tube blank are metallically bright.

6. A process according to claim 1, wherein said step of extruding is carried out in one movement.

7. A process according to claim 1, wherein said internal pressure is provided hydraulically, at a pressure of up to 35,000 bar.

8. A process according to claim 1, wherein said pipe section and said tube blank are respectively a seamless tube blank and a seamless pipe section.

9. A process according to claim 1, wherein said pipe section and said tube blank are respectively a welded tube blank and a welded pipe section.

10. A process according to claim 1, wherein said pipe section and said tube blank are respectively a seamless tube blank and a welded pipe section or a welded tube blank and a seamless pipe section.

11. A process according to claim 1, wherein said tube blank is comprised of carbon or low alloy steel, and said pipe section is comprised of corrosion-resistant stainless steel or nickel base alloy.

12. A process according to claim 1, wherein:

said shaping temperature is in a range from about 1,050 to about 1,250° C.; and said pipe combination is extruded to a multiple of an original length thereof.

* * * * *